United States Patent [19]

Dawson

[11] Patent Number: 4,599,913

[45] Date of Patent: Jul. 15, 1986

[54] ADJUSTABLE RELEASABLE CABLE COUPLING DEVICE

[76] Inventor: Wayne Dawson, Prairie Plaza Sta., Box 2233, Beulah, N. Dak. 58523

[21] Appl. No.: 580,206

[22] Filed: Feb. 15, 1984

[51] Int. Cl.⁴ .............................................. F16C 1/10
[52] U.S. Cl. ................................................ 74/501 R
[58] Field of Search ............................ 74/501 R, 502

[56] References Cited

U.S. PATENT DOCUMENTS

| | | | |
|---|---|---|---|
| 2,148,867 | 2/1939 | Lesage | 74/501 |
| 2,553,025 | 5/1951 | Weber et al. | 74/502 |
| 2,792,720 | 5/1957 | Roesch | 74/502 |

FOREIGN PATENT DOCUMENTS 516309  12/1939  United Kingdom .................. 74/502

*Primary Examiner*—Kenneth J. Dorner
*Attorney, Agent, or Firm*—Donald A. Jacobson

[57] ABSTRACT

An adjustable releasable cable fastener device for a motorcycle clutch control cable which permits adjusting cable tension and replacing the control cable without removing the clutch housing cover or draining the oil from the housing. A guide threaded into the clutch housing has a sleeve which will slideably receive a quick disconnect consisting of a receptacle which can in turn receive and hold a tip which is mounted on the end of the control cable. The receptacle is attached to the end of a second terminating cable which extends through the sleeve and is attached at the opposite end to the clutch engagement mechanism. Rotating the sleeve relative to the clutch housing will tighten or loosen tension on the control cable sheath when the control cable is installed or removed. The use of a terminating cable permits the replacement of the control cable without access to the clutch housing to facilitate on the road repairs with no clutch cover removal necessary.

2 Claims, 2 Drawing Figures

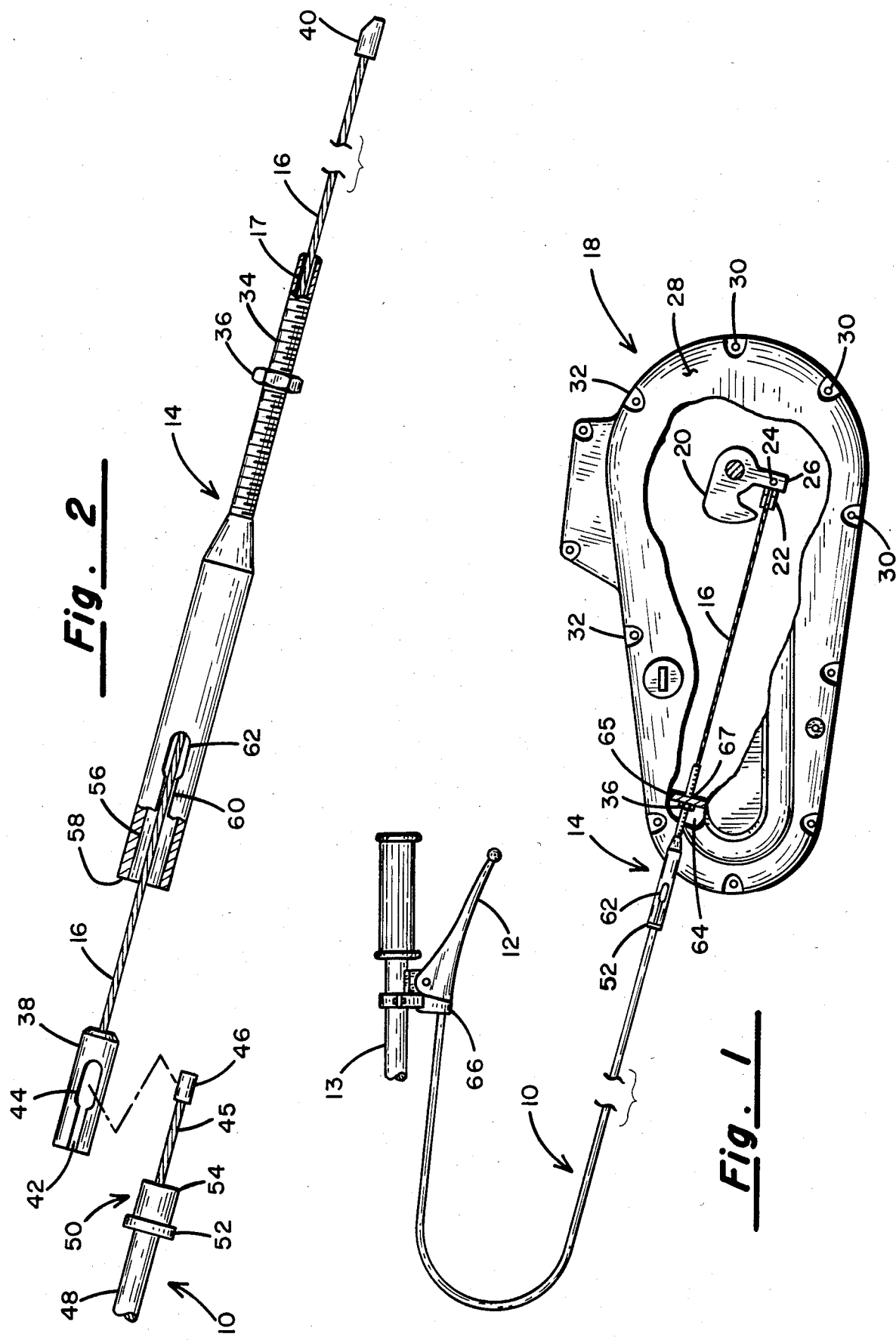

ADJUSTABLE RELEASABLE CABLE COUPLING DEVICE

BACKGROUND OF THE INVENTION

I. Field of the Invention

This invention relates generally to cable coupling mechanisms and relates particularly to a cable coupling mechanism which permits releasing, replacing, and adjusting a motorcycle clutch cable without draining the oil from the clutch housing or removing the clutch cover from the housing.

II. Description of the Prior Art

There are a number of cable coupling devices made which permit the rapid connection and disconnection of a cable from the device being controlled. In U.S. Pat. No. 4,050,327 to Thomas et al the coupling includes a cable core of flexible wires and a sheath in which the core is reciprocally slideable. An anchor fitting is swaged in place over the end of the core which can be replaced in a projection of a proper shape and size only when the connector housing is not attached to the sheath member.

In U.S. Pat. No. 4,218,925 to Ion et al a motion transmitting remote control assembly is used which prevents connection of the outer casing members of adjoining mechanical push-pull control sections unless the inner translating core members are connected.

In U.S. Pat. No. 2,643,146 to Morse an end connector is used to attach one cable to a second cable with each moving slidably within an outer sleeve to extend within each end of the fitting to a shoulder which will admit and secure the cable ends.

My present device provides an improvement on these devices by providing a means for changing tension on a cable to provide enough slack to permit connecting or disconnecting a cable connector from a mating receptacle. In addition to providing this tension change and connect/disconnect capability, this device also provides a second flexible cable connection from the external control cable to the clutch mechanism to permit removing the control cable without disturbing the motorcycle clutch housing by extending the disconnection point from the clutch to a point outside the clutch housing. This capability is of great practical importance since this allows replacing the clutch control cable without opening the clutch housing. Typically, this cable will fail in use on the road which renders the motorcycle unusable. As a result the motorcycle must either be hauled to a repair shop or the repair must be made on the spot. In the second case, since the clutch housing must be removed in existing devices to replace the clutch cable, the oil in the housing must be drained and replaced and in the process the inner clutch mechanism is inevitably exposed to the dirt, dust and other contamination of the road. These factors make the replacement of the cable a difficult task for the individual cyclist with the existing clutch cable connections which is eliminated with my device.

SUMMARY OF THE PRESENT INVENTION

An adjustable releasable cable coupling device attached between a motorcycle clutch control cable and clutch engagement mechanism to facilitate the replacement of the control cable. The control cable consists of a flexible core slideably enclosed within a flexible outer sheath with the end opposite the device attached in the usual manner to the motorcycle clutch control grip. The device provides a quick attachment and release means between the control cable and clutch engagement mechanism, a means of changing the tension on the control cable sheath and an extension terminating cable which moves the control cable attachment point from the clutch mechanism to a point outside the clutch housing. The terminating cable has a slotted receptacle which receives a tip on the end of the control cable core to provide a quick attachment and release of the control cable. The termination cable has an anchor secured at the opposite end which attaches to the clutch engagement mechanism and has a truncated end which engages the clip in only one orientation to ensure that the slot in the receptacle always faces outward. A sleeve acting as a guide for the receptacle and terminating cable is threaded into the clutch housing. This sleeve has a central bore which slideably holds the receptacle and terminating cable with an outer slotted side opening into the central bore to receive the control cable and tip. The slotted openings on the side of the guide and receiver can be aligned by rotating the guide relative to the clutch housing for attaching or removing the control cable. This adjustment also changes the tension on the control cable sheath to permit connection or removal of the cable. A lock nut adjacent to the clutch housing holds the tension setting. This attachment of the control cable external to the clutch housing and other features permits replacing a broken control cable without draining the oil from the clutch housing or removing the housing cover.

BRIEF DESCRIPTION OF THE DRAWINGS

FIG. 1 is a plan view of a motorcycle clutch, clutch housing, control cable and clutch control grip.

FIG. 2 is a plan view of one end of the control cable, a sleeve, and mating connector.

DESCRIPTION OF PREFERRED EMBODIMENT

All descriptions as to location, orientation and rotation are given with reference to the specified drawing. Referring to FIG. 1 a control cable 10 is shown which terminates on one end in a control grip 12 which is fastened at one end to the motorcycle handle bar 13 and on the opposite end to a terminating cable 16 within a sleeve 14. Terminating cable 16 is totally contained within clutch housing 18 and sleeve 14. Cable 16 is held by a clip 22 which is pivotably attached to arm 26 of clutch engagement mechanism 20 by a perpendicular cylindrical shaped extension 24 from the clip which extends through a proper size matching hole in the arm. Clutch housing 18 has a cover 28 which is secured by bolts 30 through matching holes in recesses 32 and which engage threads in matching tapped holes on an opposing matching cover, not shown.

Referring to FIG. 2 the various parts of sleeve 14 and cooperating parts can be seen. A circular central bore 17 in sleeve 14 slideably receives cable 16. Bore 17 is slightly larger than cable 16 on the right end to permit the cable to slide within the bore having a larger diameter on the left end which will be described further later. The rightmost end of sleeve 14 has threads 34 which mates both with the threads on a lock nut 36 which is placed about the sleeve and with threads through a hole in cover 18 to be described later. Terminating cable 16 has a cylindrical shaped beveled receptacle 38 secured to one end and a cylindrical shaped anchor 40 attached to the opposite end. Anchor 40 has a truncated end which fits within clip 22, shown in FIG. 1, to secure cable 16 to the clip in only one position to maintain receptacle 38 in the orientation as shown. Receptacle 38 has a slot 42 which extends radially into the receptacle slightly past the center and lengthwise from the left end to a side opening 44 which opens in the same direction. A cylindrical shaped tip 46 is attached to the end of core 45 of control cable 10. Side opening 44 is dimensioned to receive tip 46 in the orientation shown such that the tip will readily fit within the opening shown and when bottomed within the opening the tip will be centered which will also center core 45 with respect to receptacle 38.

The flexible outer sheath 48 of control cable 10 terminates in a two step cylindrical shaped stud 50 having a head 52 of a greater diameter than the body 54 and with a central bore slightly greater than the diameter of flexible core 45 such that the core can readily slide longitudinally within the stud, the stud size will be described later.

Sleeve 14 is round having a cylinder shaped left end which tapers at the approximate middle of the sleeve to a smaller cylinder shaped right end. A centered longitudinal bore 17 through sleeve 14 extends from the right end of the sleeve to the larger cylinder at the end of the taper from whence a larger bore 56 extends to the left end 58. Bore 17 has a diameter slightly greater than the diameter of cable 16 such that the cable will readily slide within the bore. Bore 56 is sized to permit receptacle 38 to slide readily within the bore. Stud body 54 has a diameter which is slightly less than the diameter of bore 56 such that the body will fit within the bore and a head 52 which is approximately the same diameter as the leftmost end 58 of sleeve 14. Sleeve 14 has side openings 60 and 62 through the wall of sleeve 14 to bore 56 both open in the same direction and of approximately the same size as slot 42 and opening 44 respectively such that tip 46 and core 45 will readily fit through these openings in the orientation shown.

The parts are assembled by rotating sleeve 14 such that side opening 44 is aligned with opening 62, extending flexible core 45 rightward out of stud 50 a distance greater than the distance of slot 62 from the leftmost end 58 of sleeve 14, then placing tip 46 through slot 62 within receptacle 38 and then into slot 44 with core 45 simultaneously being threaded into slot 42 through side opening 60. Cap 50 is then moved rightward against surface 58 on the leftmost end of sleeve 14 and opening 62 moved out of alignment with opening 44 by rotating sleeve 14 which couples the two cables together. The procedure required to accomplish this connection on a motorcycle will be described later.

Referring to FIG. 1 a recess 64 having a wall 65 perpendicular to clutch housing 18 has a centered threaded hole 67 which has the proper size and matching threads to receive threads 34 on the right end of sleeve 14 which is threaded through this hole. Nut 36 is immediately leftmost of wall 65 and acts as a lock nut.

The core 45 of control cable 10 is attached to control grip 12 with a clip, not shown, similar to clip 22 and the outer sheath 48 secured to the control grip body 66 by a clamp, not shown. With this arrangement moving control grip 12 closer to handlebar 13 by squeezing the two together will cause core 45 to pull receptacle 38 leftward which pulls terminating cable 16 by a like amount to rotate clutch engagement mechanism 20 counterclockwise in order to disengage the motorcycle clutch to stop or shift gears. Any break in flexible core 45 of cable 10 between grip 12 and receptacle 38 will prevent this disengagement.

To remove a broken control cable 10 lock nut 36 is loosened and sleeve 14 rotated until side opening 62 is opposite side opening 44 with the openings aligned. As discussed earlier, side opening 44 always faces outward therefore the orientation of sleeve 14 is merely rotated to move the sleeve right or left and rotated to align the two slots properly. With slots 44 and 62 in alignment outer sheath 48 is pulled leftward to free stud 50 from the leftmost end of sleeve 14 after which flexible core 45 and attached tip 46 can be moved outward from receptacle 38 through slot 42 and side opening 44 and then from sleeve 14 through their respective side openings 60 and 62. The opposite end of cable 10 is then freed from control grip 12 and control grip body 66 to complete removing the broken cable.

The parts are assembled by rotating sleeve 14 within housing 18 until opening 62 is aligned with opening 44. Core 45 is then extended out of sheath 48 until tip 46 extends a distance slightly greater than the distance from the leftmost end 58 of sleeve 14 from slot opening 62 such that tip 46 can be inserted through opening 62 while the core is inserted through side opening 60 through the sleeve and into receptacle 38 through opening 44 and slot 42. Sleeve 14 is then rotated to move the leftmost end 58 over stud body 54 and against stud head 52 with opening 44 out of alignment with opening 62 to retain tip 46 in receptacle 38. Locknut 36 is tightened against wall 65 to hold this adjustment. The outer sheath 48 of control cable 10 is then secured to the control grip body by the clamp and core 45 is secured to grip 12 to complete the installation.

This device permits replacing a broken control cable 10 on the road without any necessity of draining oil from clutch housing 18 or removing clutch housing cover 28. The replacement of cable 10 is rapid with no special tools required and does not admit any dust or dirt into clutch housing 18. The possibility of terminating cable 18 breaking, which would necessitate removing clutch housing cover 28, is much less than the possibility of flexible core 45 breaking because of its shorter length, its immersion in oil and the fact that there are no bends in cable 16 which would require a flexure in the cable during the engagement or release of the clutch.

This device is simple to manufacture and install on either new or existing motorcycles. The problem addressed is a common one which renders a motorcycle unusable until corrected.

Although specific construction of the herein disclosed adjustable releasable cable fastener device has been shown and described, it is obvious that those skilled in the art may make various modifications and changes to them without departing from the scope and spirit of the present invention. It is to be expressly understood that the instant invention is limited only by the appended claims.

What is claimed is:

1. In a control assembly for a machine in which a manually operated lever is coupled to a control member by means of a flexible cable disposed within a tubular sheath, said control member being disposed within a sealed housing, means for adjustably coupling said flexible cable to said control member comprising, in combination:

(a) a first control cable member having a cable segment with a proximal and a distal end, said distal end being fastened to said control member, said proximal end extending outward of said housing and having a tubular receptacle having an opening extending through the sidewall of said tubular receptacle and communicating with the central bore of said tubular receptable;

(b) a tubular sleeve member surrounding a portion of said first cable segment, said tubular sleeve member having a threaded shank portion, the bore of said tubular sleeve having a diameter greater than the outer diameter of said tubular receptable such that said tubular receptacle can be slideably received within the bore of said tubular sleeve member, said tubular sleeve member having an opening like that in said tubular receptacle extending through the sidewall thereof communicating with the bore of said tubular sleeve member, said threaded shank portion passing through a threaded aperture in said housing to allow tension adjust of said first control cable; and (c) a second control cable member having an outer sheath and a central cable segment slideably received therein, said central cable segment having a proximal end and a distal end, said proximal end adapted to be coupled to said manually operated lever, said distal end having an enlarged tip of a size which can pass through said openings in said tubular sleeve member and in said tubular receptacle when said openings are aligned one with the other.

2. The control assembly as in claim 1 and further including a cylindrical stud attached to the distal end of said outer sheath, a portion of said stud being dimensioned to slide into the facing end of said central bore of said tubular sleeve member.

* * * * *